Nov. 29, 1960    F. M. SWEENEY    2,962,402
THERMAL INSULATION COVERING FOR PIPES AND THE LIKE
Filed Dec. 3, 1956
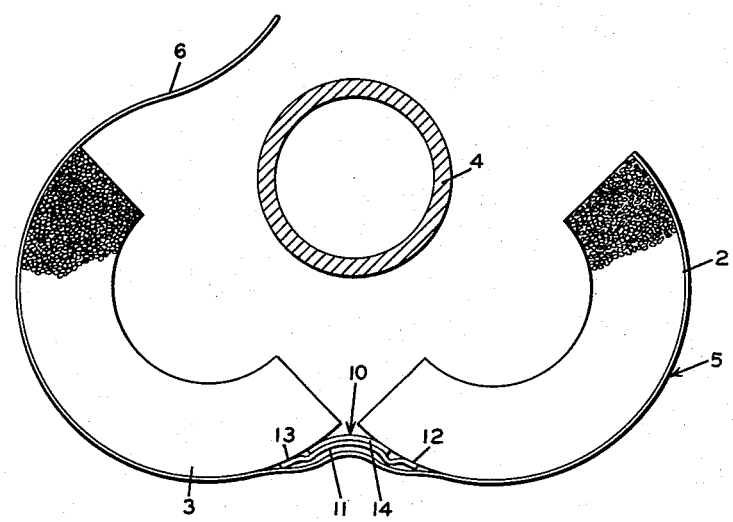
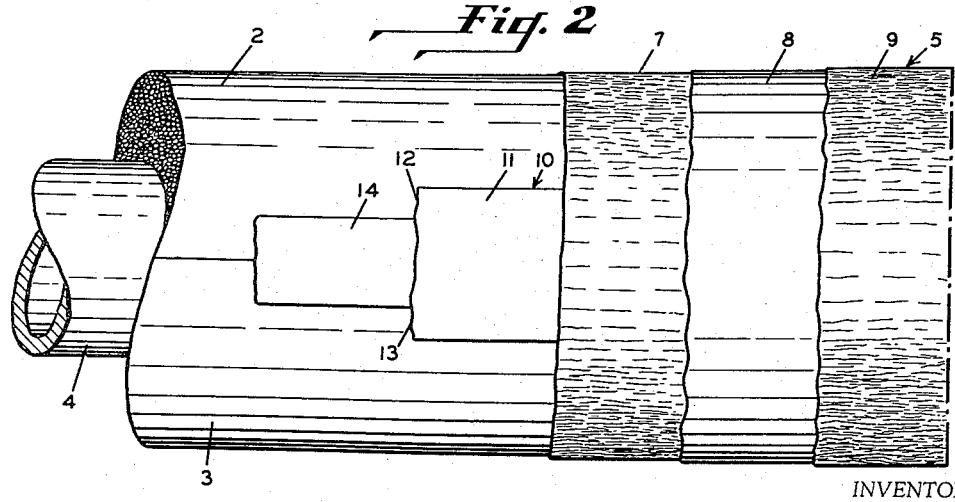
INVENTOR
FRANCIS MELVIN SWEENEY
ATTORNEY United States Patent Office 2,962,402
Patented Nov. 29, 1960

2,962,402

THERMAL INSULATION COVERING FOR PIPES AND THE LIKE

Francis Melvin Sweeney, East Hempfield Township, Lancaster County, Pa., assignor to Armstrong Cork Company, Lancaster, Pa., a corporation of Pennsylvania Filed Dec. 3, 1956, Ser. No. 625,888

2 Claims. (Cl. 154—44)

This invention relates to a thermal insulation covering for pipes and other cylindrical surfaces. It is concerned more particularly with a covering made up of segments of insulation material mounted upon a carrier or wrapper and arranged to be wrapped around the surface to be insulated, with the wrapper being overlapped and secured in position to provide a good barrier against the ready transmission of moisture-laden air into the insulation compartment. Where the covering is for small or medium sizes of pipe, the covering frequently is formed in two half sections which, when brought into abutting relationship, provide a complete insulating covering for the pipe. Sometimes the covering is formed of more than two segments, so constructed that when the covering is wrapped around the pipe it will be completely covered with insulation material. The segments are so shaped that when the covering is applied, the segments will be in good close contact with one another to avoid the presence of uninsulated areas in the structure.

The wrapper may be formed of metal foil, and the foil may be reinforced with creped, waterproof paper adhesively joined to one or both sides of the metal foil. A segmented insulation structure of the sort discussed above, including a duplexed metal foil wrapper, is disclosed in Brown Patent 2,776,231.

One of the major problems involved in the insulation of cold lines, such as pipes carrying refrigerated brine, for instance, is to prevent the ingress of moisture-laden air into the body of the insulation or into the area of the joints between the segments of which the insulation body is composed. When such moisture-carrying air penetrates into the insulation, the moisture is deposited out of the air at the dew point within the insulation, and the insulating efficiency rapidly is reduced. Should the temperature within the insulation or on the surface of the pipe be below freezing, as frequently is the case, the deposited water freezes, disrupting the insulation as the accumulation of ice builds up.

An examination of insulation failures has shown that one frequent cause of such failure has been minute breaks in the foil of the wrapper at the joint where adjacent segments of insulation abut, for it is about such points that the material is hinged when the covering is applied. This source of trouble is most likely to occur with insulation made up of two half sections; for with this type, the two halves are likely to be folded back sharply during handling while installing on the pipe, and such sharp flexing of the barrier places a substantial stress on the foil at the point and it ruptures or pin holes are formed in it.

An object of the present invention is to minimize failure of the wrapper in segmented insulation structures due to the presence of openings therein which permit the entrance of moisture-laden air into the insulation or into the area between adjacent segments of insulation.

Another object of the invention is to provide a segmented insulation provided with a reinforcement in the wrapper at the joint between contiguous segments.

A further object of the invention is to provide a segmented insulation with a hinge separate from the wrapper and securing adjacent segments together in such fashion that when the segments are positioned and are swung about the hinge, the wrapper will not be subjected to a sharp bend which might result in perforation of the wrapper and particularly the metal foil component of it.

Other objects of the invention will be apparent from the following description of an embodiment of the invention which is illustrated in the attached drawing, in which:

Figure 1 is an end view of a piece of pipe insulation embodying the invention, shown in position ready for application to a piece of pipe which is shown in section; and Figure 2 is a plan view, broken away, showing the insulation of Figure 1 installed on a piece of pipe.

The insulation shown in the drawing comprises two segments or half sections 2 and 3 which are contoured on their inner surfaces to fit closely around a pipe 4 when the segments are brought into abutting relationship. The segments or sections 2 and 3 are indicated diagrammatically as made of cellular or foamed plastic material, such as the foamed polystyrene insulation material known as "Armalite." Other insulation materials may be used, such as baked cork pipe covering segments, foamed glass insulation, glass fiber insulation, and the like.

A wrapper is positioned over the sections 2 and 3 and serves to protect the insulation against damage in shipment, installation, and use and also to provide a vapor barrier for the insulation when it is installed around a pipe or other surface. The wrapper 5 is provided with an end flap 6 which is arranged to overlie the joint between the insulation sections 2 and 3 when the covering is installed. Usually, the flap is adhesively secured to the outer face of the wrapper in the overlapped portion. Covering tapes are applied over the edges where adjacent pieces of the insulation abut, along the length of the pipe.

The wrapper 5 may be of laminated construction, as shown in Figure 2, where there is a wrapper which includes an inner layer of waterproof, creped, kraft paper 7, an intermediate layer of metal foil 8, and an outer layer of paper 9 similar to the inner layer 7. The three plies are adhesively joined together. This type of wrapper is disclosed in the Brown patent referred to above. Other types of barrier wrappers may be used, such as a single or multilayer type, as previously mentioned.

A hinge, generally designated by the numeral 10, is provided to join the sections 2 and 3. The hinge comprises a ribbon 11 which may be made of creped kraft paper or any other strong, flexible sheet material of sufficient strength to support the weight of one half-section and wide enough to insure gentle flexing with no sharp creases being possible even if one half-section be folded back to touch the other half-section. In the embodiment illustrated, where the insulation is illustrated as designed for a 2" pipe, the ribbon 11 may be about 1½" wide. The ribbon extends longitudinally over substantially the full length of the joint between sections 2 and 3. It is adhesively secured to the insulation sections 2 and 3 in areas 12 and 13 which are remote from the joint, and it thus provides for free hinging movement of the sections without any sharp bending of the ribbon or the wrapper which is disposed thereover.

Preferably, the hinge is reinforced with a band of sheet material 14 which may be the same as the ribbon 11 but only about one half as wide. In this structure, the band 14 is adhesively joined to the ribbon 11 but is not secured to the sections of insulation material. This permits the free hinging movement mentioned above.

The wrapper 5 is preferably adhesively secured to the insulation segments 2 and 3 and preferably is not attached to the hinge 10, being free to deform thereover during the hinging movement, as generally indicated in Figure 1. This will minimize the likelihood of the wrapper being perforated and providing a path for the movement of air into the insulation compartment below the wrapper. At the same time, a neat, close-fitting installation results when the segments are wrapped around the pipe and the flap on the wrapper is secured in position. The parts have been shown to an exaggerated scale in Figure 1. Actually, a very smooth outer surface is presented in the area where the wrapper overlaps the reinforced hinge.

I claim:

1. A thermal insulation for covering cylindrical surfaces comprising a plurality of segments of thermal insulation completely separable at a joint between adjacent segments and adapted to surround a cylindrical surface to be insulated when said segments are brought into abutting relationship, an imperforate water vapor barrier sheet overlying the outer surface of said segments, a hinge disposed at said joint between adjacent segments and interposed between said vapor barrier sheet and said segments to prevent perforation of said vapor barrier sheet at said joint due to hinging movement of said segments, said hinge comprising a ribbon of sheet material disposed longitudinally over substantially the full length of said joint and extending for a limited distance on either side thereof, adhesive which secures said ribbon directly to each of said adjacent segments of thermal insulation in an anchoring zone spaced away from the abutting longitudinal edge of each of said adjacent segments and hingedly anchoring said hinge ribbon to said adjacent segments for free hinging movement of each of said segments along each of said anchoring zones without sharp bending of said vapor barrier sheet which would tend to perforate the same, and an adhesive layer bonding said barrier sheet to said thermal insulation segments over said hinge.

2. A thermal insulation for covering cylindrical surfaces comprising a plurality of segments of thermal insulation completely separable at a joint between adjacent segments and adapted to surround a cylindrical surface to be insulated when said segments are brought into abutting relationship, an imperforate water vapor barrier sheet overlying the outer surface of said segments, a reinforced hinge disposed at the joint between adjacent segments and interposed between said vapor barrier sheet and said segments to prevent perforation of said barrier sheet at said joint due to hinging movement of said segments, said reinforced hinge comprising a band of sheet material disposed longitudinally over substantially the full length of said joint and extending for a limited distance on either side thereof, a wider ribbon of sheet material disposed over said band and projecting beyond both of the longitudinal edges of said band to extend for a limited distance on either side thereof beyond said joint, adhesive which secures said ribbon directly to each of said adjacent segments of thermal insulation in an anchoring zone spaced away from the abutting longitudinal edge of each of said adjacent segments for free hinging movement of each of said segments along each of said anchoring zones without sharp bending of said vapor barrier sheet which would tend to perforate said vapor barrier sheet, adhesive which secures said band to said ribbon, and adhesive which bonds said barrier sheet to said thermal insulation segments with said sheet disposed over said reinforced hinge.

References Cited in the file of this patent

UNITED STATES PATENTS

| | | |
|---|---|---|
| 488,248 | Norris | Dec. 20, 1892 |
| 763,857 | Chivers | June 28, 1904 |
| 2,016,039 | Hurrell | Oct. 1, 1935 |
| 2,089,909 | Mansfield | Aug. 10, 1937 |
| 2,129,865 | NewPort et al. | Sept. 13, 1938 |
| 2,258,176 | Denning | Oct. 7, 1941 |
| 2,276,363 | Zalkind | Mar. 17, 1942 |
| 2,776,231 | Brown | Jan. 1, 1957 |

FOREIGN PATENTS

| | | |
|---|---|---|
| 236 | Great Britain | A.D. 1904 |
| 556,351 | Great Britain | Sept. 30, 1943 |

UNITED STATES PATENT OFFICE
CERTIFICATION OF CORRECTION

November 29, 1960

Patent No. 2,962,402

Francis Melvin Sweeney

It is hereby certified that error appears in the above numbered patent requiring correction and that the said Letters Patent should read as corrected below.

Column 1, line 63, for "point" read -- joint --.

Signed and sealed this 2nd day of May 1961.

(SEAL)
Attest:

ERNEST W. SWIDER
Attesting Officer

DAVID L. LADD
Commissioner of Patents